(12) United States Patent
Marman et al.

(10) Patent No.: US 8,872,940 B2
(45) Date of Patent: Oct. 28, 2014

(54) CONTENT AWARE STORAGE OF VIDEO DATA

(75) Inventors: Douglas H. Marman, Ridgefield, WA (US); Mahesh Saptharishi, Waltham, MA (US)

(73) Assignee: VideoIQ, Inc., Bedford, MA (US)

( * ) Notice: Subject to any disclaimer, the term of this patent is extended or adjusted under 35 U.S.C. 154(b) by 631 days.

(21) Appl. No.: 12/105,871

(22) Filed: Apr. 18, 2008

(65) Prior Publication Data

US 2009/0219411 A1 Sep. 3, 2009

Related U.S. Application Data

(60) Provisional application No. 61/033,290, filed on Mar. 3, 2008.

(51) Int. Cl.
| H04N 5/76 | (2006.01) |
| H04N 9/79 | (2006.01) |
| H04N 5/77 | (2006.01) |
| H04N 5/232 | (2006.01) |

(52) U.S. Cl.
CPC ............ H04N 5/772 (2013.01); H04N 5/23203 (2013.01); H04N 9/7921 (2013.01)
USPC ........................................ 348/231.3; 348/143

(58) Field of Classification Search
None
See application file for complete search history.

(56) References Cited

U.S. PATENT DOCUMENTS

| 5,289,275 | A * | 2/1994 | Ishii et al. ..................... 348/154 |
| 6,833,865 | B1 * | 12/2004 | Fuller et al. ................ 348/231.2 |
| 7,002,478 | B2 * | 2/2006 | Moore et al. .................. 340/577 |
| 7,477,285 | B1 * | 1/2009 | Johnson ......................... 348/143 |
| 2001/0021942 | A1 * | 9/2001 | De Bot et al. ................. 709/200 |
| 2002/0122659 | A1 * | 9/2002 | McGrath et al. .............. 386/117 |
| 2003/0044168 | A1 * | 3/2003 | Matsukawa ..................... 386/117 |
| 2003/0193571 | A1 * | 10/2003 | Schultz et al. ........... 348/207.99 |
| 2004/0080618 | A1 * | 4/2004 | Norris et al. ............... 348/207.1 |
| 2004/0105450 | A1 * | 6/2004 | Ikuta et al. ..................... 370/401 |
| 2004/0131231 | A1 * | 7/2004 | Smilansky .................... 382/103 |
| 2004/0240546 | A1 | 12/2004 | Wells |

(Continued)

FOREIGN PATENT DOCUMENTS

WO WO2005/004062 A2 1/2005

OTHER PUBLICATIONS

Parker, "McGraw-Hill Dictionary of Scientific and Technical Terms," 5th Edition, 1994, McGraw-Hill, p. 2133.*
Seagate, datasheet, LD25.2 series, May 2007, 2 pp.

(Continued)

*Primary Examiner* — Dennis Hogue
(74) *Attorney, Agent, or Firm* — Baker & Hostetler LLP

(57) ABSTRACT

Video analytics and a mass storage unit are contained in a camera housing of a video camera. The video analytics analyzes video data produced by the video camera and detects whether there is an occurrence of a defined event of interest. The video data representing the field of view of the scene observed by the video camera are stored in the mass storage unit. The stored video data include video data of first and second qualities. The first quality represents the occurrence in a field of view of the video camera of the defined event of interest detected by the video analytics. The second quality represents the nonoccurrence in the field of view of the defined event of interest detected by the video analytics. Storing video data of first and second qualities reduces system storage capacity demands.

17 Claims, 8 Drawing Sheets

(56) References Cited

U.S. PATENT DOCUMENTS

| | | | |
|---|---|---|---|
| 2005/0068429 A1* | 3/2005 | Kreiner et al. | 348/231.6 |
| 2005/0169367 A1* | 8/2005 | Venetianer et al. | 375/240.01 |
| 2005/0271251 A1* | 12/2005 | Russell et al. | 382/103 |
| 2006/0078047 A1* | 4/2006 | Shu et al. | 375/240.01 |
| 2006/0140095 A1* | 6/2006 | Kazami et al. | 369/59.1 |
| 2006/0143420 A1* | 6/2006 | Van Gassel et al. | 711/170 |
| 2006/0165386 A1* | 7/2006 | Garoutte | 386/112 |
| 2006/0215904 A1* | 9/2006 | Ibrahim et al. | 382/159 |
| 2006/0227995 A1* | 10/2006 | Spatharis | 382/100 |
| 2007/0039030 A1* | 2/2007 | Romanowich et al. | 725/105 |
| 2007/0130600 A1* | 6/2007 | Yanai | 725/105 |
| 2007/0185989 A1* | 8/2007 | Corbett et al. | 709/224 |
| 2007/0217761 A1* | 9/2007 | Chen et al. | 386/86 |
| 2007/0217765 A1* | 9/2007 | Itoh et al. | 386/117 |
| 2007/0257985 A1* | 11/2007 | Estevez et al. | 348/143 |
| 2007/0296817 A1 | 12/2007 | Ebrahimi et al. | |
| 2008/0084473 A1* | 4/2008 | Romanowich | 348/135 |
| 2008/0136934 A1* | 6/2008 | Zhao et al. | 348/226.1 |
| 2008/0297599 A1* | 12/2008 | Donovan et al. | 348/143 |
| 2009/0085740 A1* | 4/2009 | Klein et al. | 340/540 |
| 2009/0135007 A1* | 5/2009 | Donovan et al. | 340/540 |
| 2010/0034420 A1* | 2/2010 | Xiong et al. | 382/100 |

OTHER PUBLICATIONS

Heybruck, Enhanced Adaptive Battery Life Extender, Hitachi, Dec. 2004, 3 pp.

Kim et al., Ramp Load/Unload Technology in Hard Disk Drives, Hitachi, Jan. 2005, 5 pp.

Hitachi, Hitachi Travelstar® 4K120, Jun. 2005, 2 pp.

Hitachi, Hitachi Travelstar® 5K250, Aug. 2007, 2 pp.

Taneja Group Technology Analysis, Five Criteria for Video Surveillance Storage, Jun. 2007, 8 pp.

ioImage, ioicamwdc 100dn Ultra-Wide-Dynamic-Range Color Day/Night Intelligent-Video IP Camera, no date, 6 pp.

Luminera, LiO45 Intelligent Network Camera with Ultra-Wide Dynamic Range, Sep. 2007, 2 pp.

Hie Electronics, Hie Electronics Disruptive Technology and Long-Term Deep Image/Data Storage: 100 and 500 Camera 1-Year Archive Case Studies: A New Perspective on Total Cost of Ownership (TCO), Jul. 28, 2007, 22 pp.

Bit Micro Networks, Flash Solid State Disk-Write Endurance in Database Environments, available at http://www.bitmicro.com/press_resources_flash_ssd_db_prt.php, Mar. 4, 2005, visited Mar. 19, 2009, 10 pp.

Panasonic, Network Security Color Camera WV-NP244, no date, 2 pp.

ioImage, VTD White Paper, 2005, 20 pp.

Peng, Video Analytics: Content analysis in security surveillance applications, available at http://www.videsignline.com/showArticle.jhtml?printable Article=true&articleId=202102695, Sep. 27, 2007, visited Oct. 8, 2007, 4 pp.

Storage on Board Surveillance, *IP Video Security Magazine*, Oct. 2007, 5 pp.

Kozierak, M., Start/Stop Cycles, *The PC Guide*, available at http://www.pcguide.com/ref/hdd/perf/qual/specCycles-c.html, Apr. 2001, visited Mar. 19, 2009, 2 pp.

Schroeder et al., Disk Failures in the Real World: What Does an MTTF of 1,000,000 Hours Mean to You?, 5th USEAUX Conference on File and Storage Technologies, available at http://www.usenix.org/events/fast07/tech/schroeder/schroeder_html/index.html, Feb. 2007, visited Mar. 19, 2009, 23 pp.

Kozierak, Cache Size, the PC Guide, available at http://www.pcguide.com/ref/hdd/oplcacheSize-c.html, Apr. 2001, visited Mar. 19, 2009, 2 pp.

International Search Report, PCT/US2009/035666, Jun. 29, 2009.

\* cited by examiner

CONTENT AWARE STORAGE OF VIDEO DATA

RELATED APPLICATION

This application claims the benefit under 35 U.S.C. §119 (e) of U.S. Provisional Application No. 61/033,290, filed Mar. 3, 2008.

TECHNICAL FIELD

This disclosure describes a video imaging system that intelligently recognizes the content of video data, reduces system storage capacity demands, and prolongs the operational lifespan of video data mass storage units.

BACKGROUND INFORMATION

Network camera systems, for example network surveillance camera systems or IP camera systems, have existed for a number of years but have undergone relatively slow industry adoption. Compared to traditional analog camera systems, network camera systems offer advantages such as accessibility, integration, low installation costs, scalability, and an ability to move to higher resolution video. Data produced by network cameras, however, demand large amounts of bandwidth and storage capacity.

Bandwidth problems associated with network camera systems have lead to more complex camera networks that include an increased number of switches and, in some cases, complete alternative data paths. Storage problems associated with network camera systems become magnified as video resolution and the number of cameras in a system increase. For example, a single standard D1 resolution camera using MPEG-4 compression and operating at 30 frames-per-second (fps) can require 360 gigabytes (GB) of storage for video data representing one month of video data. A camera system with 1000 cameras, therefore, would require 360 terabytes (TB) of storage for data spanning one month. This example demonstrates a huge cost and facility management challenge presented with network camera systems, especially where megapixel resolution is desired and where applications require six months or a year of video data storage. Due to the problems identified, most network video data are not recorded at full quality, but are recorded at lower resolutions and frame rates. Because typical high resolution cameras generate video data requiring a large amount of storage resources within a short period of time, it is impractical for a typical camera to include a self-contained storage unit, such as a hard drive, that is able to store a significant amount of video data.

Typical storage architecture of network camera systems is configured similarly to traditional analog systems. The architecture includes centrally located digital video recorders (DVRs) or network video recorders (NVRs) connected through a network to IP cameras. The typical architecture is inadequate for a number of reasons. For example, most DVRs and NVRs do not include open platforms such that a system is limited to one brand for future replacements and upgrades. Also, most DVRs and NVRs do not meet IT standards for system resiliency, redundancy, and long-term archiving of video data. Additionally, typical network camera systems often lack storage scalability such that, as network camera systems expand, storage systems require "forklift" upgrades.

Another problem with typical video data storage configurations is that many applications require storage devices to continuously run. Such continuous operation causes the storage devices to fail after five or six years of operation. Unless archived or stored redundantly, data on failed storage devices become lost. The need to replace storage devices, therefore, becomes a significant concern and maintenance issue.

Recently, some network camera systems have implemented video analytics processing to identify when important events (such as object movement) are being captured by a video camera. Video analytics has been primarily used to alert security of potential unwanted events. Most video analytics is performed by a central processor that is common to multiple cameras, but some video cameras have built-in video analytics capabilities. These video cameras with built-in analytics, however, have not included large capacity storage due to the large storage requirements of the video data generated by the camera. Also, there are some cameras configured without built-in video analytics but with built-in small storage capacity that is insufficient to serve as a substitute for traditional DVRs and NVRs.

Therefore, a need exists for a network camera system that produces high quality video data, requires less storage capacity and network bandwidth, meets IT standards, is easily scalable, and operates for a longer period of time without storage device replacement.

SUMMARY OF THE DISCLOSURE

The disclosed preferred embodiments implement methods and systems of content aware storage of video data produced by a video camera, which includes a camera housing and is adapted for connection to a network communication system. The video data produced represent a field of view of a scene observed by the video camera. Video analytics and a mass storage unit are contained in or form part of the camera housing. The video analytics analyzes the video data produced by the video camera and detects whether there is an occurrence of an event of interest. The video data representing the field of view of the scene observed by the video camera are stored in the mass storage unit. The stored video data include video data of a first quality and video data of a second quality. The first quality represents the occurrence in the field of view of the event of interest detected by the video analytics, and the second quality represents nonoccurrence in the field of view of the event of interest detected by the video analytics. By storing video data in the mass storage unit contained in or forming part of the camera housing, network bandwidth requirements are reduced because the video data need not be streamed across the network for storage purposes.

The implementation described above reduces video data storage and network bandwidth requirements of a distributed network video surveillance system that includes network communication paths between network video imaging devices and network video data stores. In such surveillance system, the network video imaging devices produce video data representing fields of view of scenes under observation by the video imaging devices, and the network video data stores store video information corresponding to the video data produced by the network video imaging devices. Each of multiple ones of the network video imaging devices is associated with a content-aware video data storage system that is capable of selective storage of video data produced by its associated network video imaging device. The content-aware video data storage system includes video analytics that analyzes the content of the video data and local video data stores that store portions of the video data in response to the analysis by the vide analytics. Video data corresponding to the portions of video data are delivered through the network communication paths to the network video data stores to provide a managed amount of video data representing at a specified quality level the fields of view of the scenes. The managed amount of the video data consumes substantially less network bandwidth and fewer data storage resources than those which would be consumed by delivery to the network video stores the video data produced by the network video imaging devices at the specified quality level and in the absence of analysis by the video analytics. While video surveillance applications are of particular interest, the above approach is applicable across a wide variety of video applications.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
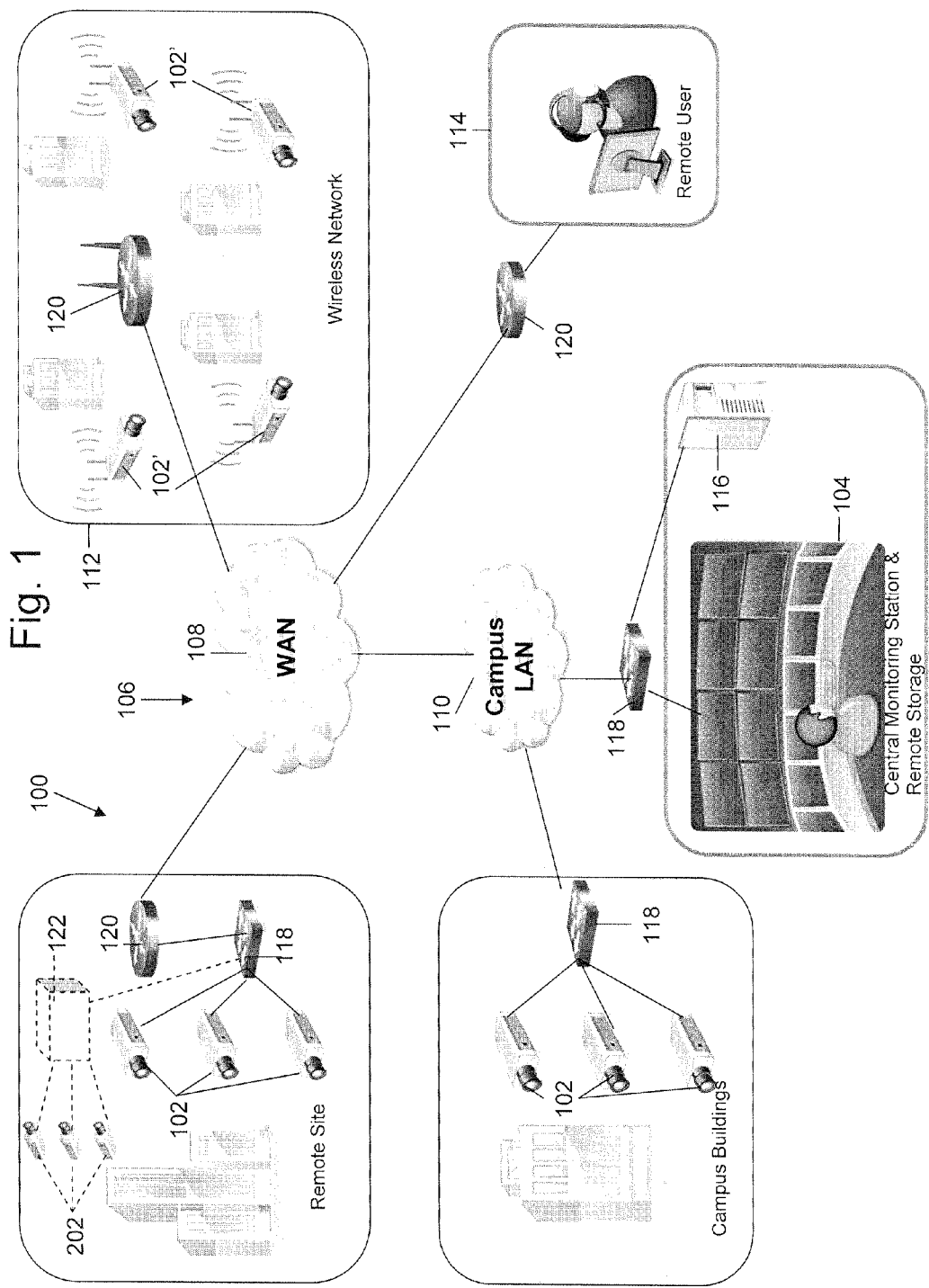
FIG. 1 depicts an embodiment of a network camera system.

System components with like reference numerals perform the same functions in each of the embodiments of a content aware storage system described below.

FIG. 1 is a pictorial diagram depicting an embodiment of a network camera system 100 utilized in an application with local campus buildings and remote sites. Network camera system 100 is not limited to video surveillance or to the application depicted, but may be used in any network communication system. Network camera system 100 includes network cameras 102 connected to a central monitoring station 104 through a network 106 that includes a wide area network (WAN) 108 and a campus local area network (LAN) 110. Network 106 may also include a wireless network 112 that includes network cameras 102' with wireless communication capabilities. Network 106 establishes multiple network communications paths. The following descriptions of network camera 102 apply also to network camera 102'. Network 106 is not limited to the configuration depicted, but may include various configurations and types of networks. A remote user 114 may also be connected to network cameras 102 through WAN 108. Network cameras 102 may be connected to a remote storage unit 116 (i.e., a network data store). Network camera system 100 may also include various switches 118 and routers 120 to facilitate communication over network 106.

In operation, network cameras 102 capture various fields of view and generate data representing the fields of view. Certain applications may require substantially continuous operation of network camera 102. The data are communicated to central monitoring station 104, in which a user may view images, generated from the data, depicting the fields of view. Also, the data may be communicated to remote user 114 to generate images of the fields of view. The data may be stored in remote storage unit 116 and later accessed by a user.

Figure 2:
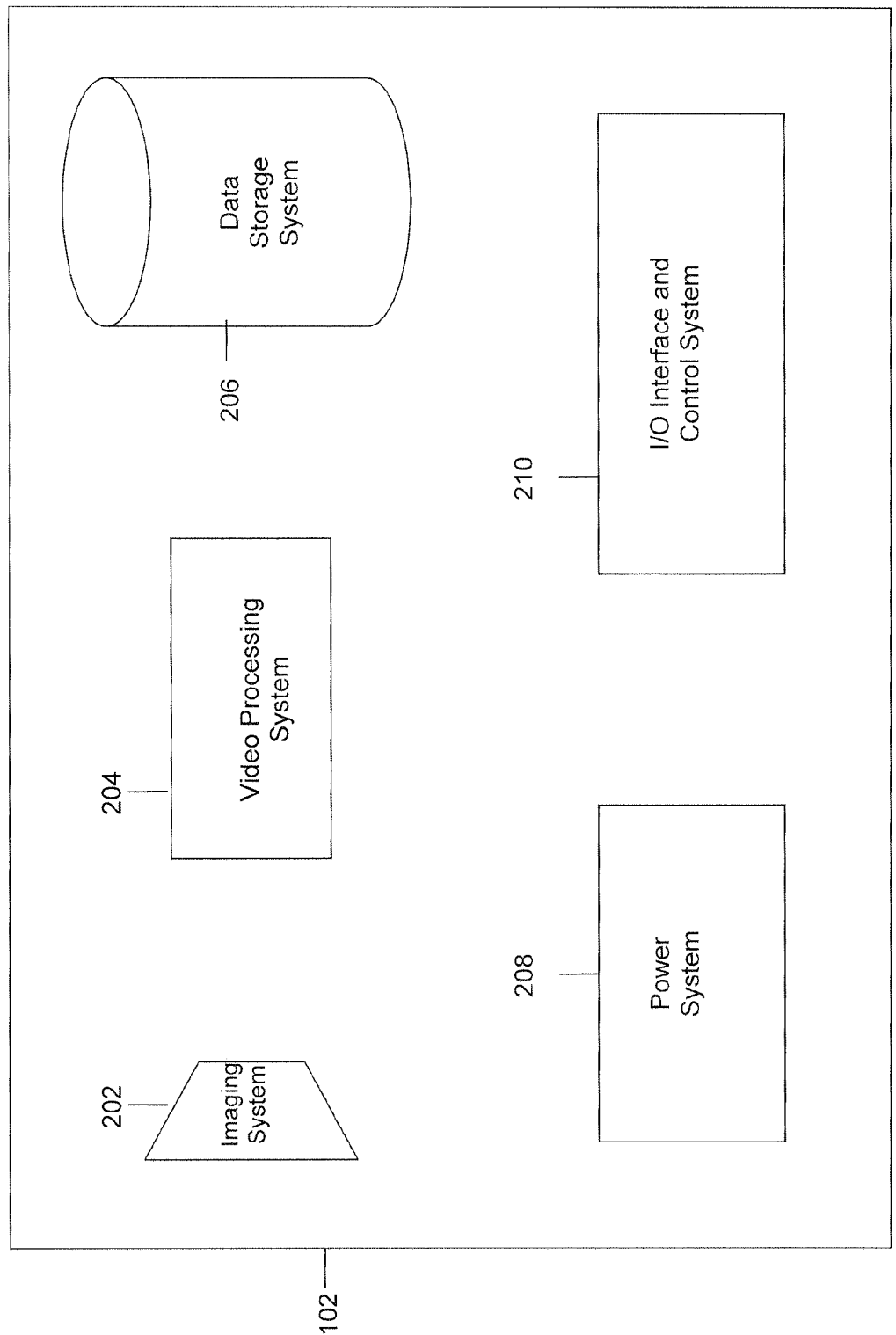
FIG. 2 is a high level block diagram of a network camera of FIG. 1.

Network camera 102 will now be described in more detail with reference to FIG. 2. Network camera 102 includes an imaging system 202, a video processing system 204, a data storage system 206 (i.e., a local data store), a power system 208, and an input/output interface and control system 210. Network camera 102 includes a camera housing; and all or portions of systems 202, 204, 206, 208, and 210 may be contained within the housing. Imaging system 202 may include a wide variety of units for capturing a field of view and for generating video information including digital data and analog signals. For example, imaging system 202 may generate information according to NTSC/PAL formats and mega-pixel formats. Imaging system 202 may include programmable imagers, high-definition imagers, no/low light sensors, and specialized imagers that are more sensitive to certain spectrums of light. Imaging system 202 may include a scalable video codec, such as MPEG-4 SVC, and other video compression capabilities, such as H.264 compression. Power system 208 may include any system for receiving and distributing electrical power to various systems of network camera 102. Power may be DC power, including Power over Ethernet (PoE), or AC power. Input/output interface and control system 210 includes various hardware and software configurations to facilitate numerous types of communication including Internet; Ethernet; universal serial bus (USB); wireless; asynchronous transfer mode (ATM); Packet over SONET/SDH (POS); pan, zoom, tilt (PZT); and audio information input/output interface and control system 210 may be implemented in hardware and software to allow a user to configure operation of network camera 102.

In an alternative embodiment, as depicted in FIG. 1, a video server 122 may be used in place of network camera 102, in which multiple imaging systems 202 capturing different fields of view are connected to video server 122. Video server 122 includes, within a server housing, video processing system 204, data storage system 206, power system 208, and input/output interface and control system 210. For clarity, network camera 102 will be referred to in the following descriptions, but the following descriptions are also applicable to situations in which multiple imaging systems 202 are connected to video server 122.

Content Aware Storage

First Embodiment

Figure 3:
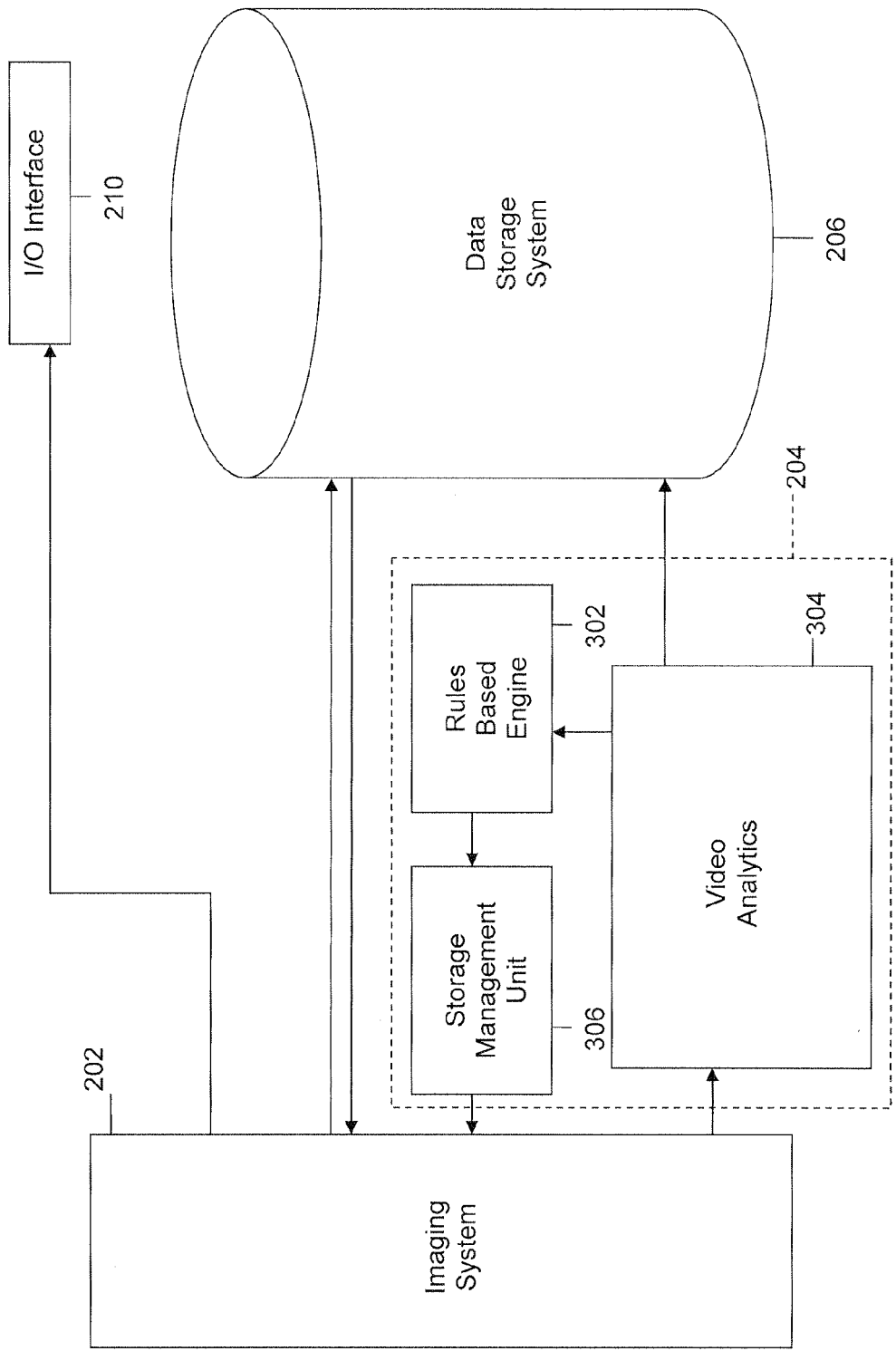
FIG. 3 is a block diagram depicting the imaging system, video processing system, and data storage system of FIG. 2 according to a first embodiment.
Figure 8:
FIG. 8 is an image of a bird perched on a birdfeeder, in which image the bird and birdfeeder are displayed as high quality images and a background scene is displayed in low quality.

A first embodiment of network camera 102 is described in more detail with reference to FIG. 3. Video processing system 204 includes a rules based engine 302, video analytics 304, and a storage management system 306, some or all of which may be implemented in software. Video analytics 304 includes video analytics software operating in a video analytics processor. Although video analysis and other video processing described in the following embodiments are performed by video processing system 204, video data may also be supplied from network camera 102 to a network-connected video processor, such as a video server (not shown), that performs all or part of the video analysis and other video processing described below. In other words, video analysis and processing may be distributed throughout network camera system 100. Video processing system 204 may also include video encryption capabilities to prevent unauthorized viewing of video information. Imaging system 202 captures a field of view and generates video data representing the field of view. Imaging system 202 may be programmable and may be capable of producing multiple quality levels of video data, including higher quality (HiQ) video data and lower quality (LowQ) video data. A quality level refers to multiple video parameters including resolution, frame rate, bit rate, and compression quality. For example, HiQ video data may represent D1 resolution video recorded at 30 frames-per-second (fps) and LowQ video data may represent CIF resolution video recorded at 5 fps. HiQ and LowQ video data are not limited to the parameters above. HiQ video data may represent D1 resolution video recorded at a lower frame rate—for example, 15 fps. In general, HiQ video data are video data that represent higher quality video than LowQ video data. HiQ video data are characterized by large storage requirements, and LowQ video data are characterized by small storage requirements. Imaging system 202 may produce more than two quality levels of video data. Imaging system 202 may be capable of producing different quality levels for different portions of a field of view within a video frame. For example, imaging system 202 may generate HiQ quality video data representing a person in the field of view while simultaneously generating LowQ video data representing background scene images of the field of view. As a further example, FIG. 8 depicts a bird perched on a birdfeeder in high resolution while the background scene is represented in low resolution.

Imaging system 202 communicates video data to video analytics 304. Video analvtics 304, via the video analvtics engine, analyzes the video data produced by imaging system 202 to detect whether a predefined event or object of interest is being captured by imaging system 202. The video data analyzed by video analytics 304 is preferably HiQ video data. Video analytics 304 generates metadata that describe the content of video data. The metadata produced by video analytics 304 may be a textual and semantic description of the content of the video.

Events and objects of interest may be programmed by a user and specified in an XML definitions file. The definitions file and video analytics 304 may be updated periodically, and definition files may be shared between video analytics 304 of different network cameras 102 within network camera system 100. Video analytics 304 of different network cameras 102 may have different analytic capabilities. Multiple events of interest may be defined, and more than one event of interest may occur at a particular time. Also, the nonoccurrence of one event leaves open the possibility of the occurrence of a second event. The metadata may be supplied to data storage system 206 and remote storage unit 116 for storage. The metadata representing an arbitrary frame n can be associated with video data representing frame n. Thus, the metadata may be searchable to allow a user to efficiently search and semantically browse large video archives.

An event of interest that video analytics 304 detects may be as simple as motion in the field of view. Video analytics 304 may also implement blob detection (e.g. detecting a group of moving pixels as a potential moving object, without identifying what type of object it is), lighting change adjustment, and geometric calibration based on object size in the field of view to distinguish objects based on types. For example, video analytics 304 may be able to classify an object as a human being, a vehicle, or another type of object and be able to recognize an object when the object appears in any portion within the field of view of network camera 102. Furthermore, video analytics 304 may be able to recognize certain identifiable features of an object such as, for example, human faces and vehicle license plates. Video analytics 304 may be able to recognize when imaging system 202 is capturing a new object and assign a unique object ID to the new object. Video analytics 304 may be able to recognize the speed and trajectory at which an object moves. Video analytics 304 may be able to recognize events such as perimeter intrusion, object movement in a particular direction, objects approaching one another, a number of objects located in a specified area, objects left behind, and object removal. Video analytics 304 can also recognize specific locations, or coordinates, within the field of view where an event or object of interest is being captured, or a combination of objects and events, as defined by a rule.

When video analytics 304 detects an event or object of interest within the video data, video analytics 304 generates metadata that correspond to the event or object of interest and supplies the metadata to rules based engine 302. Rules based engine 302 includes rules that associate events or objects of interest, specified in the metadata, to specific actions to be taken. The actions associated with the rules may be to perform, for example, one or more of the following: store HiQ or LowQ video data in data storage system 206, store HiQ or LowQ video data in remote storage unit 116, stream HiQ or LowQ video data to central monitoring station 104 or remote user 114, generate and send a short video clip file of the event of interest to central monitoring station 104 or remote user 114, send an alert (e.g., instructions to generate one or both of a visual display and an audible sound) to central monitoring station 104 or remote user 114, store video data in data storage system 206 for X period of time. For example, a user may define the following rule: when a human being enters a defined perimeter, store in data storage system 206 HiQ video data representing the intrusion, alert central monitoring station 104 of the intrusion, generate a short video clip of the intrusion and send the video clip to central monitoring station 104, and store in remote storage unit 116 HiQ video data representing the intrusion. Or, a user may define the following rule: when no event or object of interest is being captured, store in data storage system 206 LowQ video data and send no video data to central monitoring station 104. Because video analytics 304 can detect various objects and events, a wide variety of rules may be defined by a user and each rule can have different storage quality settings. Also, because multiple events of interest may occur simultaneously, a rule may correspond to a combination of events.

Storage management system 306 may control storage of video data in data storage system 206 and in remote storage unit 116. Storage management system 306 is intelligently driven by the metadata generated in video analytics 304 and the rules defined in rules based engine 302. Storage management system 306 implements the actions defined by the rules. For example, storage management system 306 communicates to imaging system 202 to generate HiQ and/or LowQ video data to be stored in data storage system 206 and remote storage unit 116. Because video analytics 304 can specify locations, or coordinates, within the field of view where an event or object of interest is being captured, storage management system 306 can communicate to imaging system 202 which portions of the field of view are to be represented with HiQ video data (portions corresponding to events or objects) and LowQ video data (remaining portions). For example, FIG. 8 depicts a scene of a bird perched on a birdfeeder. Video analytics 304 can recognize the bird and portions of the birdfeeder as the most important features of the image or as objects of interest. The bird and birdfeeder, as the objects of interest, are displayed as HiQ images, while the background scene is displayed as a LowQ image. Also, imaging system 202 may be controlled such that a "windowed view" of the event or object of interest is generated by creating video data in which only the portion of the field of view corresponding to the event or object is displayed. Because HiQ and LowQ video data may be intelligently generated based upon content, events or objects of interest may be captured and stored as HiQ video data while overall storage requirements are lowered by generating LowQ video data to represent scenes in which no event or object of interest is captured.

In an alternative embodiment, imaging system 202 generates one quality level of video data to be stored in data storage system 206. Network camera 102 includes a scalable video codec, such as MPEG-4 SVC. After the video data are analyzed by video analytics 304 and stored in data storage system 206, portions of the video data may be processed using the scalable video codec to generate a second quality level (multiple quality levels may be generated using the SVC). For example, network camera 102 generates and data storage system 206 stores HiQ video data. Some time later (e.g., minutes, hours, days), the quality level of portions of the HiQ video data that represent the nonoccurrence of an event of interest are reduced to LowQ.

Storage management system 306 can also implement storage management policies that dictate how long portions of video data are stored in data storage system 206 based upon content. For example, storage management system 306 can control data storage system 206 such that important events are retained for long periods of time while less important video data are replaced with new video data within a short period of time. Storage management system 306 also controls communication of video data between sub-storage units of data storage system 206 as described below. One goal of storage management unit 306 is to minimize the frequency of writing operations from a first sub-storage unit to a second sub-storage unit.

Because video data generated by network camera 102 are stored in data storage system 206 within the camera housing of network camera 102, the video data may be more vulnerable to damage or theft. For example, if an intruder steals network camera 102, the intruder would also have in his possession the video data. Because network camera 102 includes video analytics 304 and data storage system 206, numerous features may be implemented in system 100 to secure video data from loss or unauthorized viewing in the event that network camera 102 is stolen. For example, when an event of interest (e.g., detection of an intruder) is detected by video analytics 304, the video data representing the event of interest may be immediately streamed, or sent as video files, to remote storage unit 116, or to another network camera 102, for redundant storage. Also, shortly after the event of interest is detected, an alert and a video clip file representing the event of interest may be sent to central monitoring station 104 or remote user 114 before network camera 102 is tampered with. To prevent an intruder from viewing images captured by network camera 102, video data stored in data storage system 206 is encrypted so that the intruder cannot play back the video data. Also, video data streamed or sent as video files from network camera 102 may be encrypted to prevent unauthorized viewing.

Imaging system 202, video analytics 304, rules based engine 302, storage management system 306, and data storage system 206 cooperate to establish a content aware storage system. The content aware storage system provides a number of unique benefits not available in traditional camera systems (even those camera systems that include some form of video analytics or small capacity storage). With the content aware storage system, storage capacity needs can be greatly reduced by intelligent recognition and classification of video content. Storage capacity needs can be greatly reduced even for applications that require substantially continuous operation of network camera 102. For example, when an event of interest is captured, the content aware storage system can record the event at a HiQ level. When an event of interest is not being captured, the content aware storage system can record the video data at a LowQ level. The quality level of stored data, therefore, can be matched to the importance of the content.

Because LowQ video data may be stored when no event or object of interest is being captured, data storage system 206 may include practical storage capacity, for example 80 GB, and still be able to store video data spanning long periods of time (for example, one or two months). In comparison, a typical D1 resolution 30 fps system without content aware storage can require over 360 GB of storage for one month. Thus, typical video cameras have not been able to include a mass storage unit that can store video data spanning a long period of time. Also, because network camera 102 includes data storage system 206, video data may be stored despite network failure or network downtime due to system upgrades or maintenance. Separate networks no longer need to be set up for network cameras; network cameras can be installed on the same data network used at a particular site, saving installation costs and ongoing maintenance costs. Also, because network camera 102 includes data storage system 206, the capacity of remote storage unit 116 may be greatly reduced and remote storage unit 116 may serve primarily as backup or archival storage of important events. Also, data storage system 206 eliminates the need to include traditional DVRs and NVRs in network camera system 100.

Additionally, because network camera 102 includes data storage system 206, network bandwidth demands can be greatly reduced because network camera 102 does not have to continuously supply video data over network 106 to remote storage unit 116. Instead, network camera 102 can supply a managed amount of video data to remote storage unit 116. For example, network camera 102 may supply HiQ or LowQ video data over network 106 only when an event or object of interest is being captured. For example, events or objects of interest may be captured only ten percent or less of the time in a typical camera system. During the other 90% of the time, a user may choose to send only LowQ video data over network 106, or to send no video data at all. For wireless network 112, because network bandwidth demands are lower, more wireless network cameras 102' can be added to wireless network 112.

Because video analytics 304 can detect when an event or object of interest is being captured, the data and metadata associated with the event or object of interest can be automatically archived in remote storage unit 116 to provide added redundancy and fault tolerance. Transmission of alarm information and video data to central monitoring station 104 or remote user 114 may also be prioritized based on importance of the video content.

Also, because of the content aware storage system, users can categorize different events or objects of interest by assigning priority values. The video data associated with the events or objects of interest can be stored intelligently in data storage system 206 for preset time periods that vary based upon the priority values. For example, less important events may be deleted after one month, but more important events may be stored for three months, six months, or a year. Also, when combined with the scalable video codec capabilities of imaging system 202, video data can be retained in data storage system 206 but reduced according to different resolutions and frame rates based upon the video content so that the video data take up less space.

Figure 4:
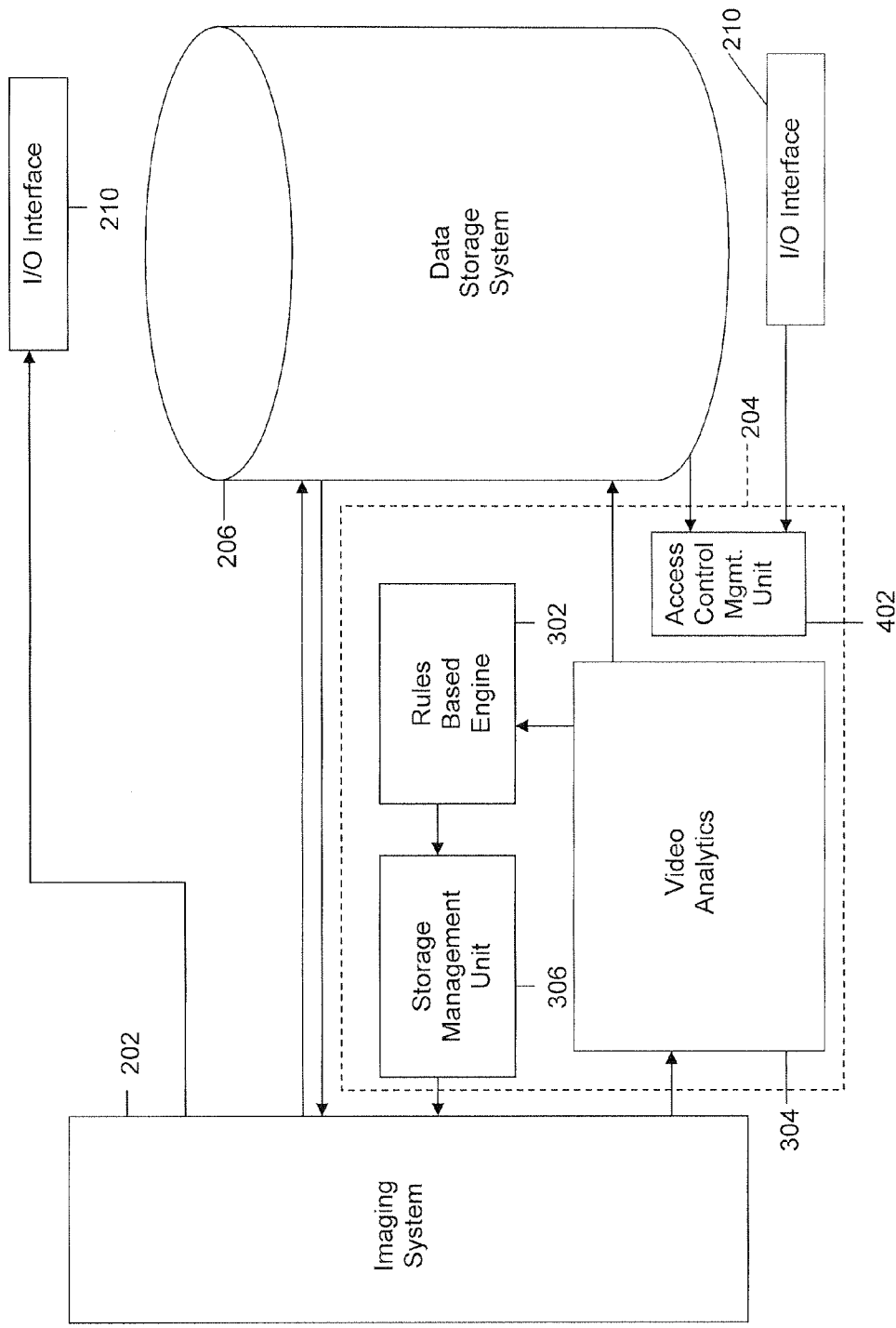
FIG. 4 is a block diagram depicting an access control management unit operating in the video processing system of the first embodiment of FIG. 3.

Because video analytics 304 generates metadata that can be stored in data storage system 206 and remote storage unit 116, access to video data stored in data storage system 206 and remote storage unit 116 may be controlled based on content. Also, access to live video data may be controlled as metadata is created corresponding to the video data. As depicted in FIG. 4, video processing system 204 may include an access control management unit 402, which is preferably implemented in software. According to rules in rules based engine 302, different content security levels are assigned to different events or objects of interest so that access to video data may be controlled according to content. Also, different users have one or more security levels assigned to them—the security levels corresponding to one or more of the content security levels. Access control management unit 402 controls access to stored video data such that a user may access only the video data that include a content security level corresponding to the user's security level. Security managers, for example, may access video data flagged for security breaches or threats, but may be prevented from accessing video data that have been captured for business or marketing purposes. Likewise, marketing personnel may access video data identified for their applications but not access video security data. Policies on video encryption may also be controlled based upon content.

The content aware storage system may also intelligently distribute stored video data to maximize the available storage capacity. For example, to meet its storage needs, a first network camera 102 may need only one-half of the capacity of its data storage system 206, while a second network camera 102 may require more storage capacity than the capacity of its data storage system 206. Video data from the second network camera 102 may be supplied over network 106 to the first network camera 102 to be stored therein. Because data storage system 206 of one network camera can store data of another network camera, the total storage capacity in the system 100 can be maximized and redundant storage of important data may be distributed throughout system 100. Maximizing total storage capacity and distributing redundant storage of important data make the important data more immune to tampering or failure. Additionally, storage transfer could take place at low bandwidth times of the day.

The content aware storage system also allows network camera system 100 to be easily scalable. In conventional systems, as the number of cameras increases, storage capacity must increase by adding units to a remote storage facility. Moreover, processing power must increase by adding units to a central processing facility. With a content aware storage system, remote storage and processing facilities do not require upgrades as network cameras 102 are added to network camera system 100. Instead, each network camera 102 contains its own storage capacity (via data storage system 206) and processing power (via video processing system 204). Thus, when a network camera 102 is added to network camera system 100, the storage capacity and processing power increase simultaneously.

Second Embodiment

Figure 5:
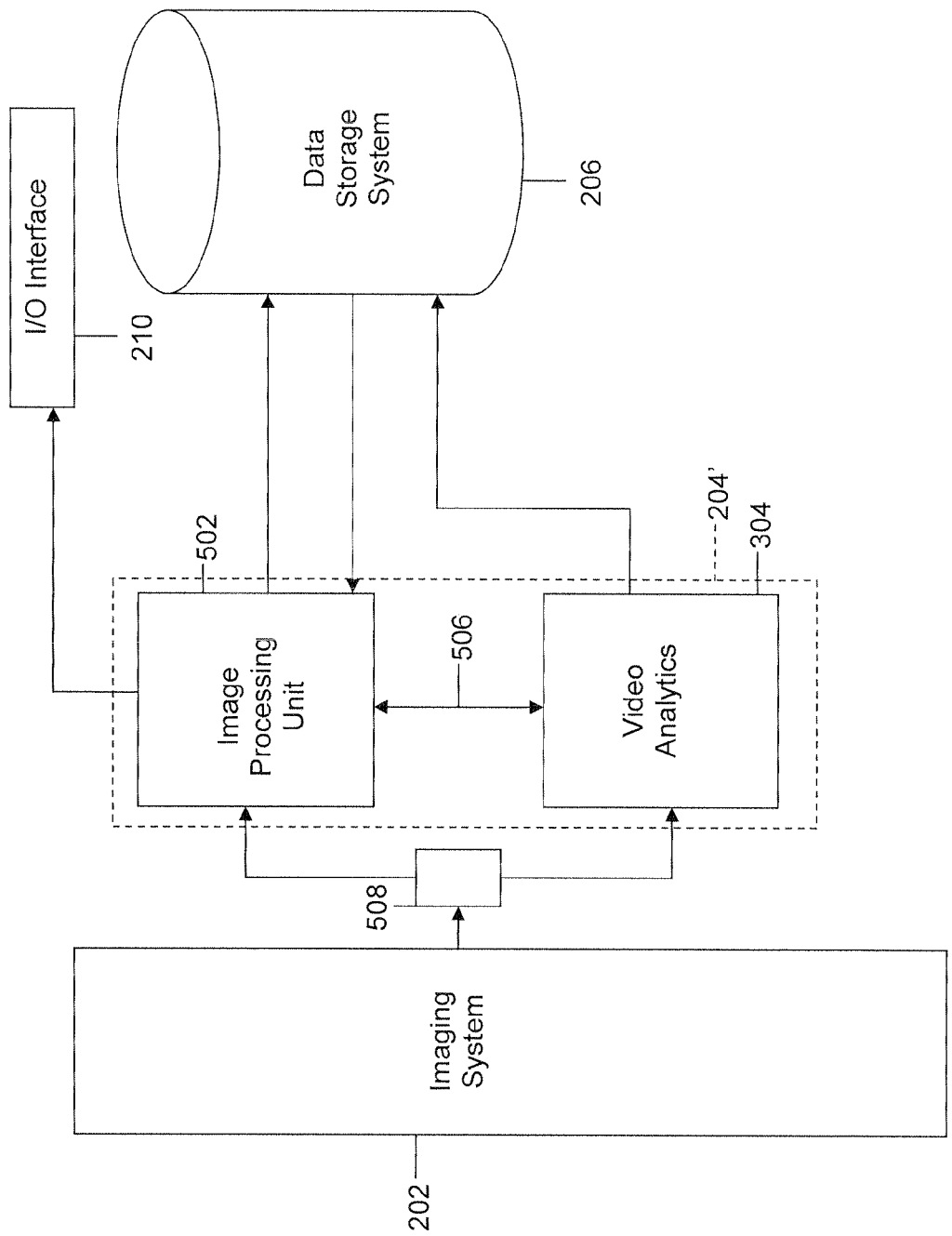
FIG. 5 is a block diagram depicting a second embodiment of the imaging system, video processing system, and data storage system of FIG. 2.

A second embodiment of camera 102 is described with reference to FIG. 5 and includes imaging system 202, video processing system 204', and data storage system 206. Video processing system 204' of the second embodiment includes video analytics 304 and an image processing unit 502. Image processing unit 502 generates video data to be communicated to central monitoring station 104 and stored in data storage system 206 and remote storage unit 116. Image processing unit 502 may be capable of compressing D1 resolution video data according to the H.264/AVC standard at 30 fps. Image processing unit 502 may be, for example, a Freescale Semiconductor® i.MX27 multimedia applications processor. Video analytics 304 analyzes data to determine whether the data contain predetermined types of content. Video analytics 304 may be capable of performing MPEG4/CIF encoding. Video analytics 304 may also deliver video data to a PAL/NTSC monitor (not shown). Video analytics 304 may implement, for example, a Texas Instruments DaVinci™ DM6437 Digital Video Development Platform. Additionally, image processing unit 502 and video analytics 304 may communicate with each other through an inter-processor bridge 506.

Video data generated by imaging system 202 are supplied to image processing unit 502 and video analytics 304. Each frame of video represented in the video data receives a time stamp, which is applied by a time-stamp block 508 that is positioned between imaging system 202 and image processing unit 502 and video analytics 304.

Image processing unit 502 will now be described in more detail with reference to FIG. 6. Image processing unit 502 includes a first encoder 602, a second encoder 604, streaming and archive control unit 606, rules based engine 302, access control management unit 402, and storage management system 306. Streaming and archive control unit 606, rules based engine 302, access management unit 402, and storage management unit 306 may be implemented in software. First and second encoders 602 and 604 may be implemented in hardware as application specific integrated circuitry or in software. First and second encoders 602 and 604 receive the video data generated by imaging system 202. First and second encoders 602 and 604 encode the video data at two different quality levels. As described above, a quality level refers to a number of video processing parameters including resolution, frame rate, bit rate, and video compression quality. First encoder 602 encodes the video data at a HiQ level to produce HiQ video data, and second encoder 604 encodes the video data at a LowQ level to produce LowQ video data.

Figure 6:
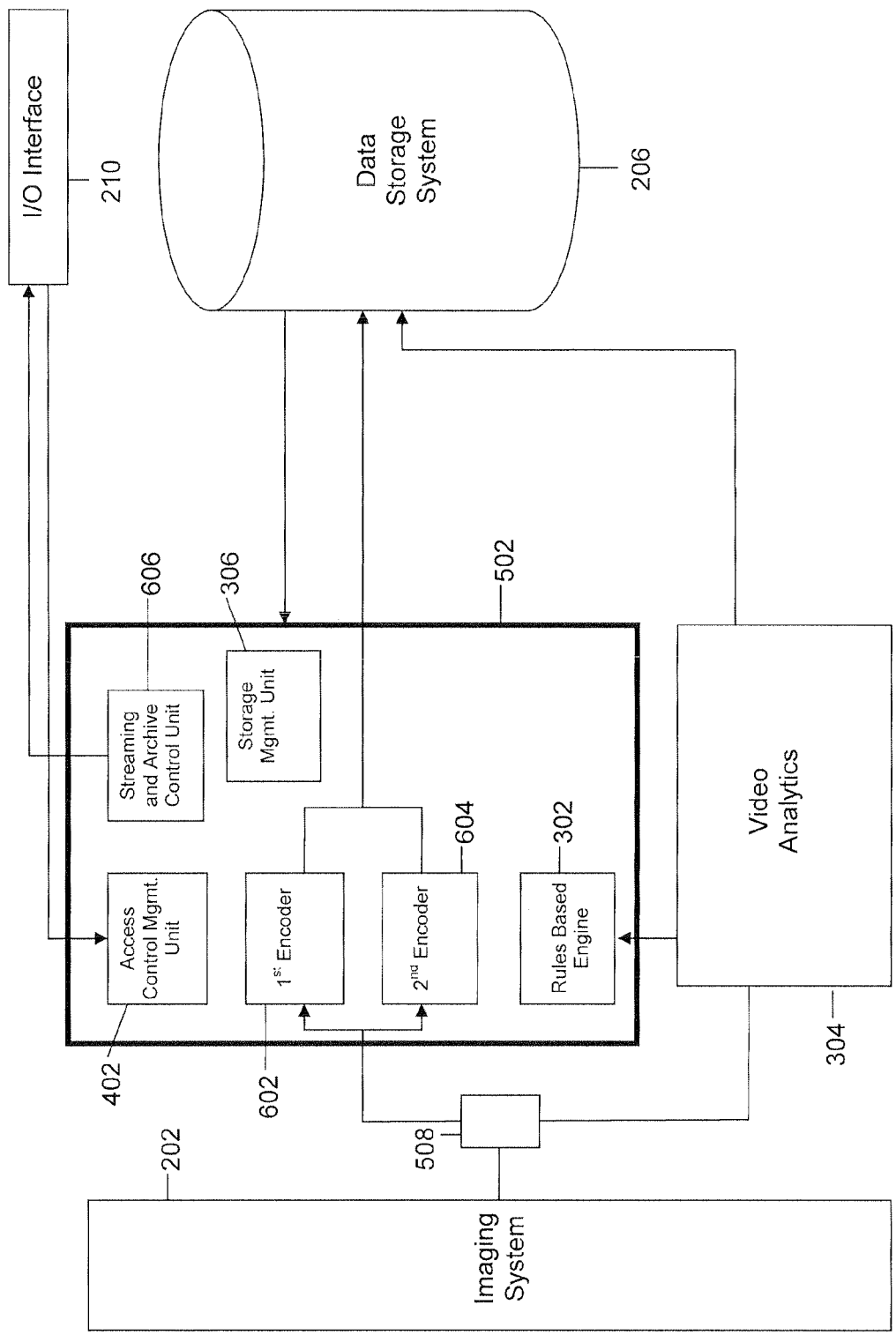
FIG. 6 is a block diagram depicting portions of the video processing system of the second embodiment.

Although two encoders are depicted in FIG. 6, image processing unit 502 may include more than two encoders to produce several streams video data of multiple quality levels, or the quality levels of encoders 602 and 604 may change based on the type of event detected by video analytics 304. Preferably, encoders 602 and 604 can encode video data simultaneously. For example, encoder 604 encodes the video data continuously and encoder 602 encodes the video data only when an event of interest is detected such that, when an event of interest is detected, encoder 602 encodes the event at a LowQ level while encoder 604 encodes the event at a HiQ level. Continuous recording of LowQ video data and intermittent recording of HiQ video data substantially reduce storage resource requirements. For example, a 24-hour period may include approximately five hours in which an event of interest is being detected. If network camera 102 recorded five hours of D1 resolution video at 15 fps using H.264 compression, those five hours would require approximately 0.86 GB of storage. If network camera 102 also recorded 24 hours of CIF resolution video at five fps using H.264 compression, the 24 hours would require approximately 0.4 GB of storage for a total of 1.26 GB/day. If data storage system 206 of network camera 102 included 80 GB of storage, data storage system 206 could record approximately two months of video. In comparison, a typical camera that continuously records D1 resolution video at 15 fps using MPEG-4 compression requires approximately 5.4 GB of storage per day. Thus, a typical 16 channel video system requires approximately 5 TB of storage for a two-month period.

Continuous recording at LowQ is desirable in case video analytics 304 misses the occurrence of an event of interest.

The LowQ video data can be reviewed by a user to view the event missed by video analytics 304. Thus, LowQ video data can be continuously recorded to ensure that nothing has been missed, while HiQ video data are recorded when important events have been detected by video analytics 304.

One or both streams of HiQ and LowQ video data are supplied to data storage system 206 and streaming and archiving control unit 606, depending on video content and defined rules of rules based engine 302. Streaming and archiving control unit 606 facilitate communication of live HiQ and LowQ video data, video data stored in data storage unit 206, video clip files representing events of interests, and alarms to central monitoring station 104, remote storage unit 116, and remote user 114. For example, after an event of interest is captured and stored in data storage system 206, HiQ video data representing the event of interest stored in data storage system 206 may be communicated to remote storage unit 116, via streaming and archiving control unit 606, for redundant storage of the event of interest.

Rules based engine 302 receives metadata produced by video analytics 304 and determines from the metadata whether the HiQ or LowQ video data are to be stored in data storage system 206 and/or communicated to central monitoring station 104, remote storage unit 116, and remote user 114.

Access control management unit 402 controls access to live and stored video data. Access control management unit 402 allows multiple user accounts to be created with corresponding permissions to access portions of video data based upon the content of the video data.

Storage management system 306 is intelligently driven by the metadata generated in video analytics 304 and the rules defined in rules based engine 302. Storage management system 306 also controls communication of video data between sub-storage units of data storage system 206.

In operation, imaging system 202 captures a field of view and generates video data. Frames of the video data are time-stamped in time-stamp block 508 so that metadata generated by video analytics 304 may be synchronized with video data generated by image processing unit 502. Video analytics 304 analyzes the video data generated by imaging system 202 and generates metadata based upon the content of the video data. First encoder 602 and second encoder 604 also receive the video data generated by imaging system 202 and generate, respectively, HiQ video data and LowQ video data.

The metadata is communicated to rules based engine 302 over inter-processor bridge 506 and rules based engine 302 determines whether a rule has been violated (i.e., whether an event or object of interest detected by video analytics 304 requires action). Based on the metadata and the rules of rules based engine 302, storage management system 306 controls first encoder 602 and second encoder 604 to supply HiQ video data and/or LowQ video data to data storage system 206. Portions of the HiQ and LowQ video data may be segmented into video clip files. Storage management system 306 also controls whether to send HiQ or LowQ video data, via streaming and archiving control unit 606, to central data storage unit 116.

For example, if the metadata communicates that no object or event of interest is being captured within the field of view of network camera 102, a rule may communicate to storage management system 306 to control first and second encoders 602 and 604 such that the LowQ video data are supplied to data storage system 206 and no video data are supplied to remote storage unit 116. In an alternative example, if the metadata communicates that an object or event of interest is occurring within the field of view of network camera 102, a rule may communicate to storage management system 306 to control first and second encoders 602 and 604 such that HiQ and LowQ video data representing the object or event are supplied to data storage system 206. Because both HiQ and LowQ video data are stored in data storage system 206, the event of interest may be played back in a higher bandwidth or lower bandwidth mode. Also, when an event of interest is captured, a video clip file of the event of interest stored in data storage system 206 may be communicated to central monitoring station 104 via streaming and archiving control unit 606. A video clip file may be a short HiQ video segment of the event of interest that is stored in data storage system 206. A video clip file may represent seven seconds of video in which two seconds are before the event occurs and five seconds are after the event is detected. The duration of the video clip may be programmed to be any length. The video clip file may be played back multiple times, forwarded to other users via e-mail, or stored on a removable disk and sent to, for example, law enforcement. As described in the first embodiment, users may define any combination of actions to be taken based upon the metadata, such as storing HiQ video data in data storage system 206 and remote storage unit 116 while simultaneously streaming LowQ video data to central monitoring station 104. Users may also define a rule that an alert be sent to central monitoring station 104 or to remote user 114 via e-mail whenever an event or object of interest is detected. For example, remote user 114 may receive an alert on a mobile device such as a cellular phone or personal digital assistant (PDA), together with a video clip that can be played on the mobile device.

Although the above embodiments have been described, network camera 102 is not limited to these two embodiments. Network camera 102 may include any camera system capable of analyzing the content of video data to detect motion or another event of interest, and capable of generating more than one quality level of video data.

Data Storage System

Figure 7:
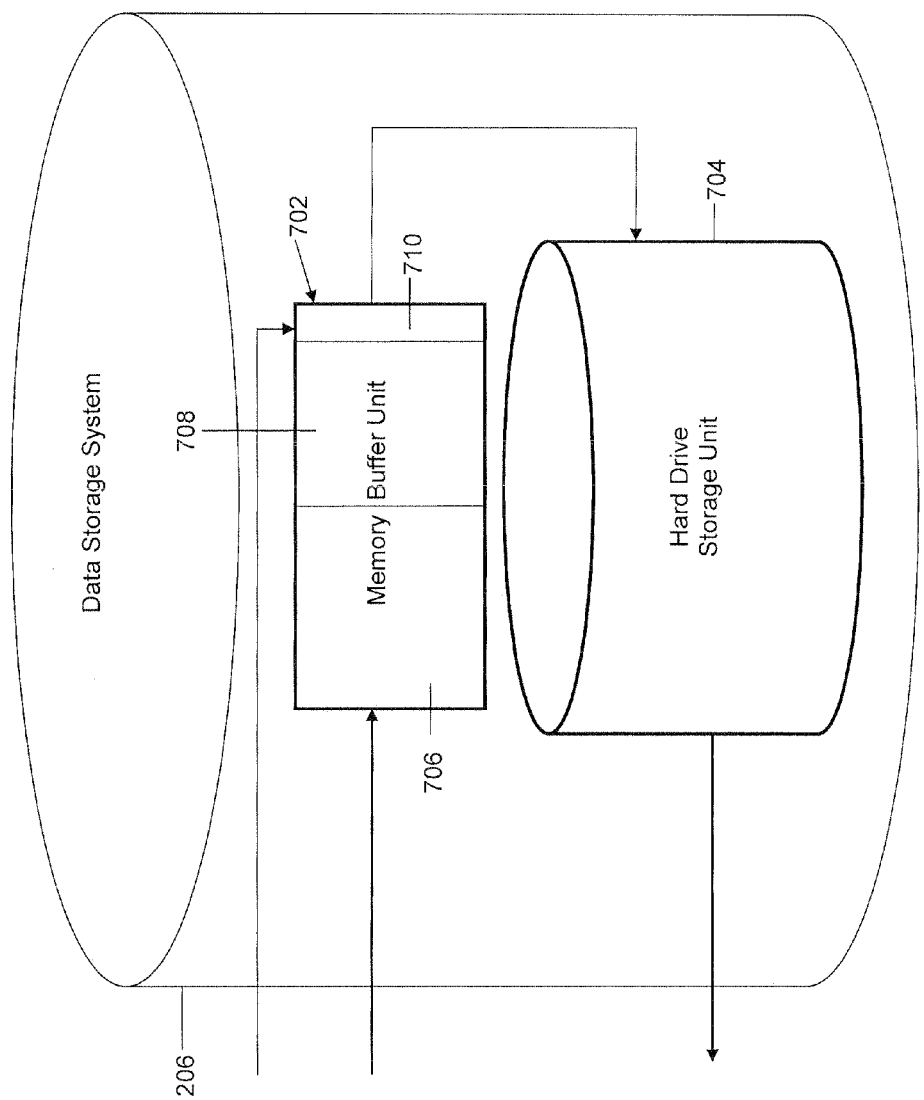
FIG. 7 is a block diagram representing a memory buffer unit and a hard drive storage unit of data storage system.

Data storage system 206 is described in detail with reference to FIG. 7. Data storage system 206 may be included in network camera 102, or data storage system 206 may be external to network camera 102 and may communicate with network camera 102 over network 106. Data storage system 206 serves as a mass storage unit that includes at least one GB, preferably 80 GB or more, of storage capacity. Data storage system 206 includes a solid state memory buffer unit 702 and a hard drive storage unit 704.

Memory buffer unit 702 may include non-volatile and volatile memory, such as NAND flash memory and RAM. If volatile memory is used as memory buffer unit 702, a secondary power supply may be included in network camera 102 in case of power failure. In a preferred embodiment, one GB of NAND flash memory is used, but memory buffer unit 702 may include a memory size larger or smaller than one GB. Sectors of memory buffer unit 702 may be allocated for different types of data, as indicated by portions 706, 708, and 710. For example, portion 706 represents 50% of memory allocated to store the most recent video data captured by imaging system 202. Portion 708 represents 40% of memory allocated to store the most recent events or objects of interest captured by imaging system 202. Portion 710 represents 10% of memory allocated to store metadata generated by video analytics 304. Allocation of memory is not limited to the above example and can be adapted to meet the needs of a particular application. Also, portions 706, 708, and 710 may be periodically rotated to correspond to different sectors of memory buffer unit 702 to prolong the operating lifespan of the sectors of memory buffer unit 702.

Hard drive storage unit 704 may be any type of mass storage device including a hard-disk drive and a large capacity solid state memory device. For simplicity, hard drive storage unit 704 will be described as a hard-disk drive but many of the features described below are also applicable to a large capacity solid state memory device. The storage capacity of hard drive storage unit 704 may be any size, but, preferably, the storage capacity would be 80 GB or more. Hard drive storage unit 704 includes a read/write head and a storage memory disk.

In operation, during a first time interval, memory buffer unit 702 receives video data from imaging system 202 or video processing system 204' and stores the video data in portions 706 or 708, as directed by storage management system 306, according to the content of the video data. Memory buffer unit 702 also receives metadata generated by video analytics 304 and stores the metadata in portion 710. Because the metadata is synchronized to the video data, the video data can be quickly searched according to content by referring to the metadata. For the majority of time that video data and metadata are being stored in memory buffer unit 702 hard drive storage unit 704 is in a powered-down state. A powered-down state includes multiple states such as a total power-off state or one of several idle, standby, or sleep states described in connection with Hitachi's Enhanced Adaptive Battery Life Extender (ABLE)™ technology. For example, in a powered-down state, the read/write head may be in a "loaded" or activated condition without executing read/write commands while the storage memory disk is spinning, the read/write head may be in a "loaded" or activated condition while the storage memory disk is not spinning, the read/write head may be in an "unloaded" or non-activated condition while the storage memory disk is spinning, or the read/write head may be in an "unloaded" or non-activated condition while the storage memory disk is not spinning. Generally, a powered-down state is characterized by a power level less than a power level of a powered-up state. A total memory buffer storage time represents a sum of the first time intervals.

During a second time interval determined by storage management system 306, hard drive storage unit 704 is powered-up (i.e., the read/write head is in an activated condition to execute read/write commands and the storage memory disk is spinning) and video data from one or more portions 706 and 708 are communicated from memory buffer unit 702 to hard drive storage unit 704 to be stored in hard drive storage unit 704. Metadata from portion 710 may also be communicated to hard drive storage unit 704 during the second time interval. Storage management system 306 determines the amount of data that are to be supplied from memory buffer unit 702 and written to hard drive storage unit 704. During the second time interval, memory buffer unit 702 may continue to receive and store video data and metadata to prevent interruption in the storing of video data and metadata. At the end of the second time interval (e.g., after a predetermined amount of data of memory buffer unit 702 are written to hard drive storage unit 704) memory buffer unit 702 stops supplying data to hard drive storage unit 704 and hard drive storage unit 704 is powered-down. A total hard drive storage time represents a sum of the second time intervals. The total hard drive storage time spent transferring to and storing a portion of the video data in hard drive storage unit 704 is substantially less that the total memory buffer storage time spent storing the video data in memory buffer unit 702.

Storage management system 306 may control a write operation from memory buffer unit 702 to hard drive storage unit 704 at any time such as when a predetermined condition is satisfied. For example, a predetermined condition might be to perform the write operation when one of portions 706, 708, or 710 is near capacity. Or, in mobile applications such as a camera in a vehicle, a write operation may be performed when a motion sensor, accelerometer, or other sensor located within the vehicle indicates that the vehicle is stationary so that damage to the hard drive storage unit 704 may be avoided or to eliminate the need to include a hard drive with extensive shock absorption. The motion sensor, accelerometer, or other sensor may be contained within the camera housing. A sensor includes a vehicle on/off switch. For example, when a vehicle is turned off, the vehicle battery may keep data storage system 206 powered-up so that video data may be transferred from memory buffer unit 702 to hard drive storage unit 704 during the off state of the vehicle-ideally, the vehicle is stationary during an off state. The write operation may be stopped when all the data from one or more portions 706, 708, and 710 have been written to hard drive storage unit 704 or when another condition is met, such as vehicle movement. Additionally, storage management system 306 may control hard drive storage unit 704 to be powered-up when a user requests retrieval of video data stored in hard drive storage unit 704. Hard drive storage unit 704 would be powered-up to supply video data to video processing system 204 (204') so that the video data may be supplied to a user over network 106.

In mobile applications, a single data storage system 206 may serve multiple imaging systems 202 of a vehicle (e.g., multiple cameras on a bus), or one hard drive storage unit 704 may serve multiple imaging systems 202 that include their own memory buffer units 702. When the vehicle comes to a stop, hard drive storage unit 704 is powered-up and data is transferred from memory buffer unit(s) 702 quickly by optimizing the communication speed between memory buffer unit(s) 702 and the hard drive storage unit 704 and by implementing a hard drive storage unit 704 with a fast write speed (e.g., approximately 665 Mbits/sec or more). Also, when a vehicle includes multiple imaging systems 202, data transfer can be accomplished quickly by lowering the frame rate of each imaging system 202 without substantially sacrificing video quality. For example, if a vehicle included eight cameras operating at 7.5 fps, the video data generated by the eight cameras would be equivalent to data generated by two cameras operating at 30 fps.

By storing video data in memory buffer unit 702 and by powering-up hard drive storage unit 704 periodically, the operating life of the hard drive storage unit 704 may be extended because hard drive storage unit 704 is not constantly powered-up. For example, if D1 resolution video data are recorded at 30 fps and compressed using MPEG-4 compression, portion 706, with 500 MB of storage capacity, could record approximately one hour of D1 resolution video data. Depending on the data transfer rate of memory buffer unit 702 and hard drive storage unit 704, 500 MB of data may be transferred from memory buffer unit 702 to hard drive storage unit 704 in four minutes or less. Thus, out of one hour, hard drive storage unit 704 may need to be powered-up for only four minutes. This represents a $1/15$ ratio. The powered-up ratio of hard drive storage unit 704 is not limited to $1/15$, but may be greater or less and may vary over time depending on the content of the video data. For example, a user may choose to store lower than full frame rate video in which hard drive storage unit 704 could be powered-up less frequently than once per hour. Preferably, the average powered-up duration will be substantially less than the average powered-down duration. By comparison, a typical hard drive that is powered-up continuously may have a lifespan of approximately five years. By powering-up hard drive storage unit 704 for four minutes out of one hour, for example, the lifespan of hard drive storage unit 704 may be increased by more than ten times the lifespan of a typical, continuously operated hard drive. Thus, by decreasing the power-up hours of hard drive storage unit 704, the lifespan of hard drive storage unit 704 is extended.

Because hard drive storage unit 704 is powered-up and down repeatedly, a preferred embodiment of hard drive storage unit 704 includes a wear durable hard drive in which the number of on/off cycles does not substantially reduce the lifespan of hard drive storage unit 704. A wear durable hard drive includes a read/write head that is physically parked off a storage memory disk (i.e., "unloaded") during one or more of the powered-down states such that the read/write head does not contact the storage memory disk during a powered-up state or a powered-down state. For example, hard drive storage unit 704 may implement Hitachi's ramp load/unload technology described in connection with its Travelstar® hard drive.

In a conventional contact start-stop (CSS) hard drive, the read/write head rests directly on the storage memory disk during an off state. When the CSS hard drive is powered-up, the read/write head and the storage memory disk remain in contact until air generated by the spinning storage memory disk causes the read/write head to lift off of the storage memory disk. Because the read/write head and the storage memory disk are in contact while the storage memory disk is spinning, the read/write head and the storage memory disk of a CSS hard drive are subject to wear. For example, a CSS hard drive may be able to withstand only 50,000 on/off cycles before failure. If a CSS hard drive was cycled on and off once per hour, the CSS hard drive would last only five or six years.

In contrast, a wear durable hard drive can withstand, for example, 300,000 on/off cycles or more preferably 600,000 on/off cycles or more. In other words, if the preferred wear durable hard drive is cycled on and off once per hour, the hard drive would last about 60 years or more. Thus, by implementing the wear durable hard drive of the preferred embodiment, the number of on/off cycles will not substantially reduce the lifespan of hard drive storage unit 704. Because the lifespan of data storage system 206 is relatively long, data storage system 206 requires little maintenance or upgrade. Thus, a network edge device, such as network camera 102, can practically include data storage system 206. In contrast, without implementing the life extension features described above, a network camera system that provided a large number of mass storage units in network edge devices would require large repair and maintenance costs. This is so because the mass storage units would fail frequently and be distributed in places difficult to serve (such as on tops of tall poles). With the life extension features described above, mass storage units can be provided in network edge devices without the need of frequent replacement.

It will be obvious to those having skill in the art that many changes may be made to the details of the above-described embodiments without departing from the underlying principles of the invention. The scope of the present invention should, therefore, be determined only by the following claims.

The invention claimed is:

1. A network camera, comprising:
    an imaging system configured to capture a field of view and generate video of the field of view, the field of view having a plurality of regions and the imaging system being further configured to capture different regions in the field of view with at least two different quality levels;
    video analytics connected to the imaging system to receive the video, the video analytics configured to analyze the video to detect objects or events of interest in the video and locations of the objects or the events of interest in the field of view and to generate metadata corresponding to the objects or the events of interest and the locations of the objects or the events of interest;
    a data storage system connected to the imaging system to receive and store the video from the imaging system and connected to the video analytics to receive and store the metadata from the video analytics;
    a rules based engine connected to the video analytics to receive the metadata, the rules based engine configured to analyze the metadata and to determine actions to be taken based on rules that associate the metadata with the actions; and
    a storage management system connected to the rules based engine, the storage management system configured to control the imaging system to set the different quality levels for regions in the field of view in the video at the locations where the objects or events of interest are detected based on the actions determined by the rules based engine,
    wherein the rules based engine is further configured to determine priorities for the video according to the rules, and the storage management system is further configured to control the data storage system to retain the video for periods of time determined according to the priorities.

2. The network camera as recited in claim 1, wherein the objects or events of interest include a motion detected within the field of view.

3. The network camera as recited in claim 1, wherein the objects or events of interest include a blob detected within the field of view.

4. The network camera as recited in claim 1, wherein the objects or events of interest includes a predefined object and a tracked movement of the predefined object.

5. The network camera as recited in claim 1, wherein the video analytics is configured to use geometric parameters to recognize an object among the objects or events of interest as the object moves to different locations.

6. The network camera as recited in claim 1, wherein the metadata further describes the video.

7. The network camera as recited in claim 1, further comprising an access control system connected to the data storage system, the access control system configured to, in response to a request associated with specific metadata, provide access to a specific portion of the video to which the specific metadata corresponds.

8. The network camera as recited in claim 1, further comprising an access control system connected to the data storage system, the access control system configured to, in response to a request associated with content-specific metadata, provide access to a specific portion of the video to which the content-specific metadata corresponds.

9. The network camera as recited in claim 1, wherein the actions to be taken based on the rules include setting a high quality level for a first region in the field of view in the video and setting a low quality level for a second region in the field of view in the video.

10. The network camera as recited in claim 9, wherein the first region corresponds to one or more locations of detected objects or events of interest in the field of view and the second region corresponds to a remainder of the field of view where no objects or events of interest are in the field of view.

11. The network camera as recited in claim 1, wherein the actions to be taken based on the rules include generating and sending a short video clip file of the objects or events of interest to a central monitoring station.

12. The network camera as recited in claim 1, wherein the actions to be taken based on the rules include generating and sending a short video clip file of the objects or events of interest to a remote user.

13. The network camera as recited in claim 1, wherein the actions to be taken based on the rules include generating and sending an alert to a central monitoring station.

14. The network camera as recited in claim 13, wherein the alert is sent upon detection of objects or events of interest.

15. The network camera as recited in claim 1, wherein the actions to be taken based on the rules include generating and sending an alert to a remote user.

16. The network camera as recited in claim 15, wherein the alert is sent upon detection of objects or events of interest.

17. The network camera as recited in claim 1, wherein the quality levels correspond to one or more of a resolution, a frame rate, a bit rate, a compression quality, and an encryption level.

* * * * *